United States Patent
Sanneck et al.

(10) Patent No.: US 10,412,601 B2
(45) Date of Patent: Sep. 10, 2019

(54) COORDINATION IN SELF-ORGANIZING NETWORKS

(71) Applicant: NOKIA SOLUTIONS AND NETWORKS OY, Espoo (FI)

(72) Inventors: Henning Sanneck, Munich (DE); Haitao Tang, Espoo (FI); Juergen Goerge, Neuried (DE); Lars Christoph Schmelz, Haar (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 108 days.

(21) Appl. No.: 14/896,972

(22) PCT Filed: Jun. 13, 2013

(86) PCT No.: PCT/EP2013/062269
§ 371 (c)(1),
(2) Date: Dec. 9, 2015

(87) PCT Pub. No.: WO2014/198321
PCT Pub. Date: Dec. 18, 2014

(65) Prior Publication Data
US 2016/0183102 A1 Jun. 23, 2016

(51) Int. Cl.
*H04W 24/02* (2009.01)
*H04W 84/18* (2009.01)

(52) U.S. Cl.
CPC ........... *H04W 24/02* (2013.01); *H04W 84/18* (2013.01)

(58) Field of Classification Search
CPC .............................. H04W 24/02; H04W 84/18
See application file for complete search history.

(56) References Cited

U.S. PATENT DOCUMENTS

| | | | |
|---|---|---|---|
| 7,321,879 B2 * | 1/2008 | Yang | G06Q 10/10 706/12 |
| 2008/0219294 A1 | 9/2008 | Landers | |
| 2010/0182987 A1 * | 7/2010 | Shin | H04W 74/0816 370/338 |
| 2011/0294527 A1 * | 12/2011 | Brueck | H04W 24/02 455/466 |

(Continued)

FOREIGN PATENT DOCUMENTS

| | | |
|---|---|---|
| CN | 101253491 A | 8/2008 |
| WO | WO 2012/072445 A1 | 6/2012 |
| WO | WO 2012/143055 A1 | 10/2012 |
| WO | 2013/071965 A1 | 5/2013 |

OTHER PUBLICATIONS

Andreas Lobinger et al: "Coordinating Handover Parameter Optimization and Load Balancing in LIE Self-Optimizing Networks", Vehicular Technology Conference (VTC Spring), 2011 IEEE 73rd, IEEE, May 15, 2011 (May 15, 2011), pp. 1-5, XP031896961, ISBN: 978-1-4244-8332-7p. 3, right-hand column, line 15—p. 4, right-hand column, line 24, 5 pages.

(Continued)

*Primary Examiner* — Omar J Ghowrwal
(74) *Attorney, Agent, or Firm* — Squire Patton Boggs (US) LLP

(57) ABSTRACT

A method comprises receiving at a training coordinator training information from a self-organizing network function and network related information and providing to a self-organizing network function coordinator a first training request comprising a training request for said self-organizing network function and one or more of network related information and training information about one or more other self-organizing network functions.

19 Claims, 8 Drawing Sheets

(56) References Cited

U.S. PATENT DOCUMENTS

| | | | |
|---|---|---|---|
| 2012/0039175 A1 | 2/2012 | Sridhar et al. | |
| 2013/0176901 A1* | 7/2013 | Merlin | H04W 28/06 370/255 |
| 2014/0040450 A1* | 2/2014 | Sanneck | H04L 41/04 709/223 |
| 2014/0321349 A1* | 10/2014 | Seok | H04W 74/08 370/311 |

OTHER PUBLICATIONS

Self-Organization in 4G Mobile Networks: Motivation and Vision; Ulrich Barth, Edgar Kuehn; 7th International Symposium on Wireless Communication, 5 pages.

12th IFIP/IEEE International Symposium on Integrated Network Management 2011 "A Coordination Framework for Self-Organisation in L TE Networks" Lars Christoph Schmelz et al., 8 pages.

Socrates 2011, 'Final Report on Self-Organisation and its Implications in Wireless Access Networks', Deliverable D5.9, INFSO-ICT-216284 Socrates, January. http://www.fp7-socrates.eu/, 135 pages.

International Search Report & Written Opinion dated Feb. 20, 2014 corresponding to International Patent Application No. PCT/EP2013/062269.

Chinese Office Action issued in corresponding Chinese Patent Application No. 201380077369.6 dated Mar. 5, 2018.

Chinese Office Action application No. 201380077369.6 dated Sep. 28, 2018.

Chinese Office Action corresponding to Application No. 201380077369.6, dated Apr. 1, 2019.

* cited by examiner

COORDINATION IN SELF-ORGANIZING NETWORKS

Embodiments relate a method and an apparatus and in particular but not exclusively to a method and apparatus for use in a self-organising network.

A communication system can be seen as a facility that enables communication sessions between two or more entities such as mobile communication devices and/or other stations associated with the communication system. A communication system and a compatible communication device typically operate in accordance with a given standard or specification which sets out what the various entities associated with the system are permitted to do and how that should be achieved. For example, the manner how the communication device can access the communication system and how communications shall be implemented between communicating devices, the elements of the communication network and/or other communication devices is typically defined.

In a wireless communication system at least a part of communications between at least two stations occurs over a wireless link. Examples of wireless systems include public land mobile networks (PLMN), satellite based communication systems and different wireless local networks, for example wireless local area networks (WLAN). In wireless systems a network element or network entity (NE) or access node is provided by a base station. The radio coverage area of a base station is known as a cell, and therefore the wireless systems are often referred to as cellular systems. In some systems, for example a 3GPP standard system, a base station access node is called Node B (NB) or an enhanced Node B (eNB).

A user can access the communication system by means of an appropriate communication device. A communication device of a user is often referred to as user equipment (UE). A communication device is provided with an appropriate signal receiving and transmitting arrangement for enabling communications with other parties. A communication device may be arranged to communicate, for example, data for carrying communications such as voice, electronic mail (email), text message, multimedia, for enabling internet access and so on. Users may thus be offered and provided numerous services via their communication devices. The communication connection can be provided by means of one or more data bearers.

In wireless systems a communication device provides a transceiver station that can communicate with the access node and/or another communications device.

Network management is a complex task. Complexity arises on the one side from the number of network elements (NEs) that have to be deployed and managed, and on the other side from interdependencies between the configuration and the status of the deployed network elements in terms of performance, faults, etc. In a heterogeneous network the variety of deployed technologies and their proprietary operational paradigms are difficult to handle. The configuration, optimization and troubleshooting of the management of the network therefore requires high expertise and operational management workflows to be typically performed by human operators supported by software tools. However, such manual and semi-automated management is time-consuming, error-prone, and potentially unable to react quickly enough to network changes and thus expensive.

It has been a goal of network management designers to attempt to automate operation, administration and management (OAM) functions by the deployment of "Self Organizing Networks" (SON).

According to an aspect, there is provided a method comprising: receiving at a training coordinator training information from a self-organising network function and network related information; and providing to a self-organising network function coordinator a first training request comprising a training request for said self-organising network function and one or more of network related information and training information about one or more other self-organising network functions.

The method may comprise determining at least one of a training area and time.

The training information may comprise a received training request.

The method may comprise determining if said received training request is to be granted.

The determining may comprise using at least one of: training coordination information associated with at least one other self-organising network function; and network related information.

The method may comprise if said determining determines that said received training request is to be granted, processing said received training request to provide said first training request.

The processing may comprise adding one or more said training area and said time to training request.

The processing may comprise adding one or more of network related information and training information about one or more other self-organising network functions to said first training request.

The training information may comprise one or more of function type of said self-organising network function; training area; and time.

The network related information may be received from a network.

The network related information may comprise one or more of: a network element alarm; a fault management event; a performance management event; and a configuration management event.

The coordinated training request may be configured to cause the self-organising network function coordinator to lock a part of said network to avoid a conflict between said coordinated training request and another coordinated training request or a configuration change.

According to another aspect, there is provided a method comprising: providing to receiving at a self-organising network function coordinator a first training request comprising a training request for a self-organising network function and one or more of: network related information and training information about one or more other self-organising network functions.

According to another aspect, there is provided a training coordinator apparatus comprising at least one processor and at least one memory including computer code for one or more programs, the at least one memory and the computer code configured, with the at least one processor, to cause the apparatus at least to: receive training information from a self-organising network function and network related information; and provide to a self-organising network function coordinator a first training request comprising a training request for said self-organising network function and one or more of network related information and training information about one or more other self-organising network functions.

The at least one memory and the computer code are configured, with the at least one processor, to cause the apparatus to determine at least one of a training area and time.

The training information comprises a received training request.

The at least one memory and the computer code may be configured, with the at least one processor, to determine if said received training request is to be granted.

The at least one memory and the computer code may be configured, with the at least one processor, to cause the apparatus to use at least one of: training coordination information associated with at least one other self-organising network function; and network related information to determine if said received training request is to be granted.

The a least one memory and the computer code may be configured, with the at least one processor, to process said received training request to provide said first training request, if said received training request is to be granted.

The at least one memory and the computer code may be configured, with the at least one processor, to add one or more of training area and time to said first training request.

The at least one memory and the computer code may be configured, with the at least one processor to add one or more of network related information and training information about one or more other self-organising network functions to said first training request.

The training information may comprise one or more of function type of said self-organising network function; training area; and time.

The at least one memory and the computer code may be configured, with the at least one processor, to receive said network related information from a network.

The network related information may comprise one or more of: a network element alarm; a fault management event; a performance management event; and a configuration management event.

The coordinated training request may be is configured to cause the self-organising network function coordinator to lock a part of said network to avoid a conflict between said coordinated training request and another coordinated training request or a configuration change.

According to an aspect, there is provided a self-organising network function coordinator apparatus comprising at least one processor and at least one memory including computer code for one or more programs, the at least one memory and the computer code configured, with the at least one processor, to cause the apparatus at least to: receive a first training request comprising a training request for a self-organising network function and one or more of: network related information and training information about one or more other self-organising network functions.

According to an aspect, there is provided a training coordinator apparatus comprising: means for receiving training information from a self-organising network function and network related information; and means for providing to a self-organising network function coordinator a first training request comprising a training request for said self-organising network function and one or more of network related information and training information about one or more other self-organising network functions.

The apparatus may comprise means for determining at least one of a training area and time.

The training information may comprise a received training request.

The apparatus may comprise determining means for determining if said received training request is to be granted.

The determining means may be for using at least one of: training coordination information associated with at least one other self-organising network function; and network related information.

The apparatus may comprise processing means, wherein if said determining determines that said received training request is to be granted, said processing means is for processing said received training request to provide said first training request.

The processing means may be for adding one or more of training area and time to training request.

The processing means may be for adding one or more of network related information and training information about one or more other self-organising network functions to said first training request.

The training information may comprise one or more of function type of said self-organising network function; training area; and time.

The network related information may be received from a network.

The network related information may comprise one or more of: a network element alarm; a fault management event; a performance management event; and a configuration management event.

The coordinated training request may be configured to cause the self-organising network function coordinator to lock a part of said network to avoid a conflict between said coordinated training request and another coordinated training request or a configuration change.

According to another aspect, there is provided a self-organising network function coordinator apparatus comprising: means for receiving a first training request comprising a training request for a self-organising network function and one or more of: network related information and training information about one or more other self-organising network functions.

The a self-organising network function coordinator apparatus and the training coordinator apparatus may be separate apparatus or provided in by the same entity. A computer program comprising program code means adapted to perform the method may also be provided. The computer program may be stored and/or otherwise embodied by means of a carrier medium.

Various other aspects and further embodiments are also described in the following detailed description and in the attached claims.

Embodiments will now be described in further detail, by way of example only, with reference to the following examples and accompanying drawings, in which.

Figure 4:
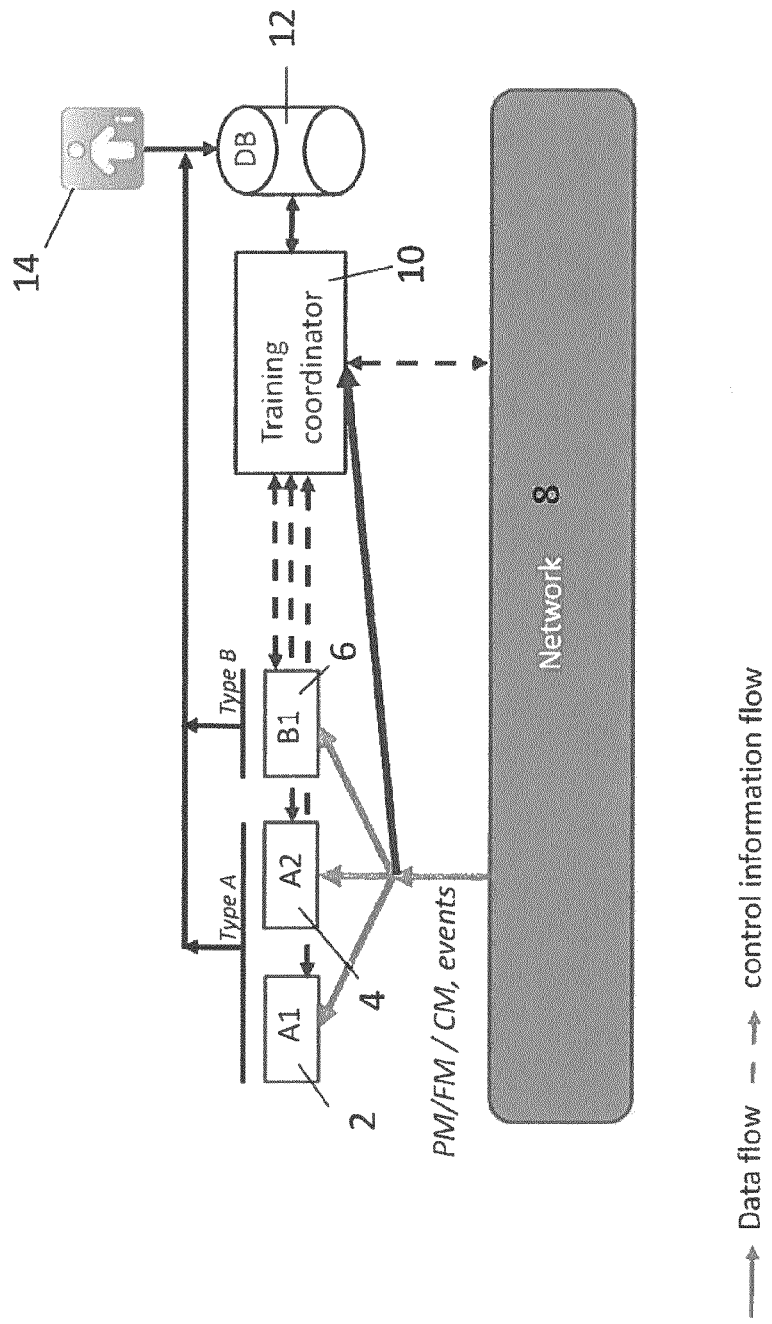
Figure 5:
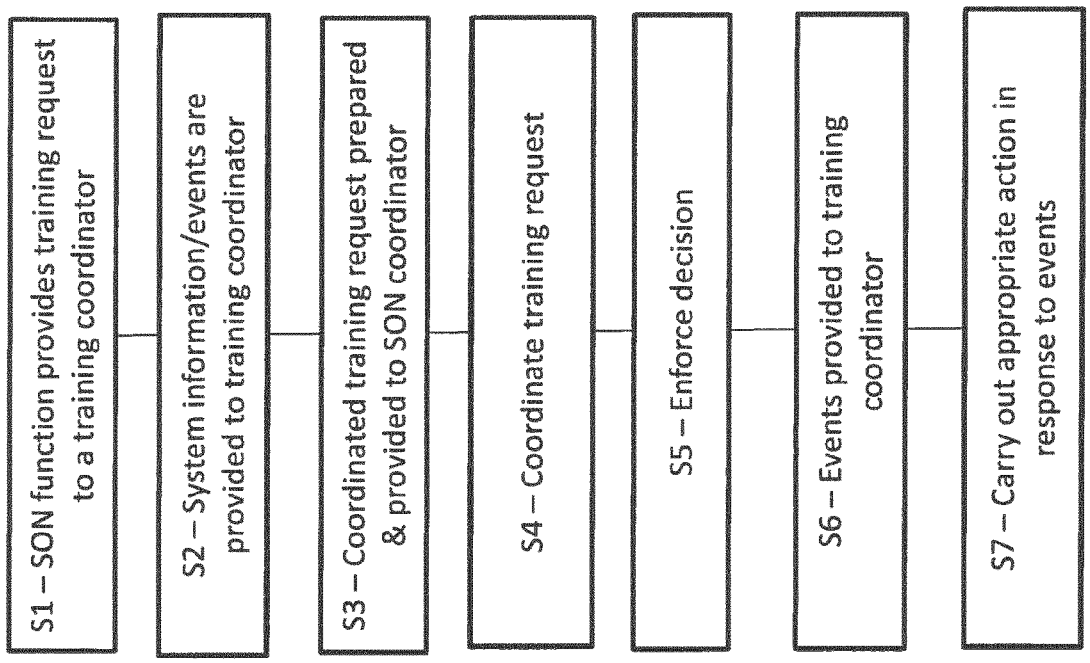
Figure 6:
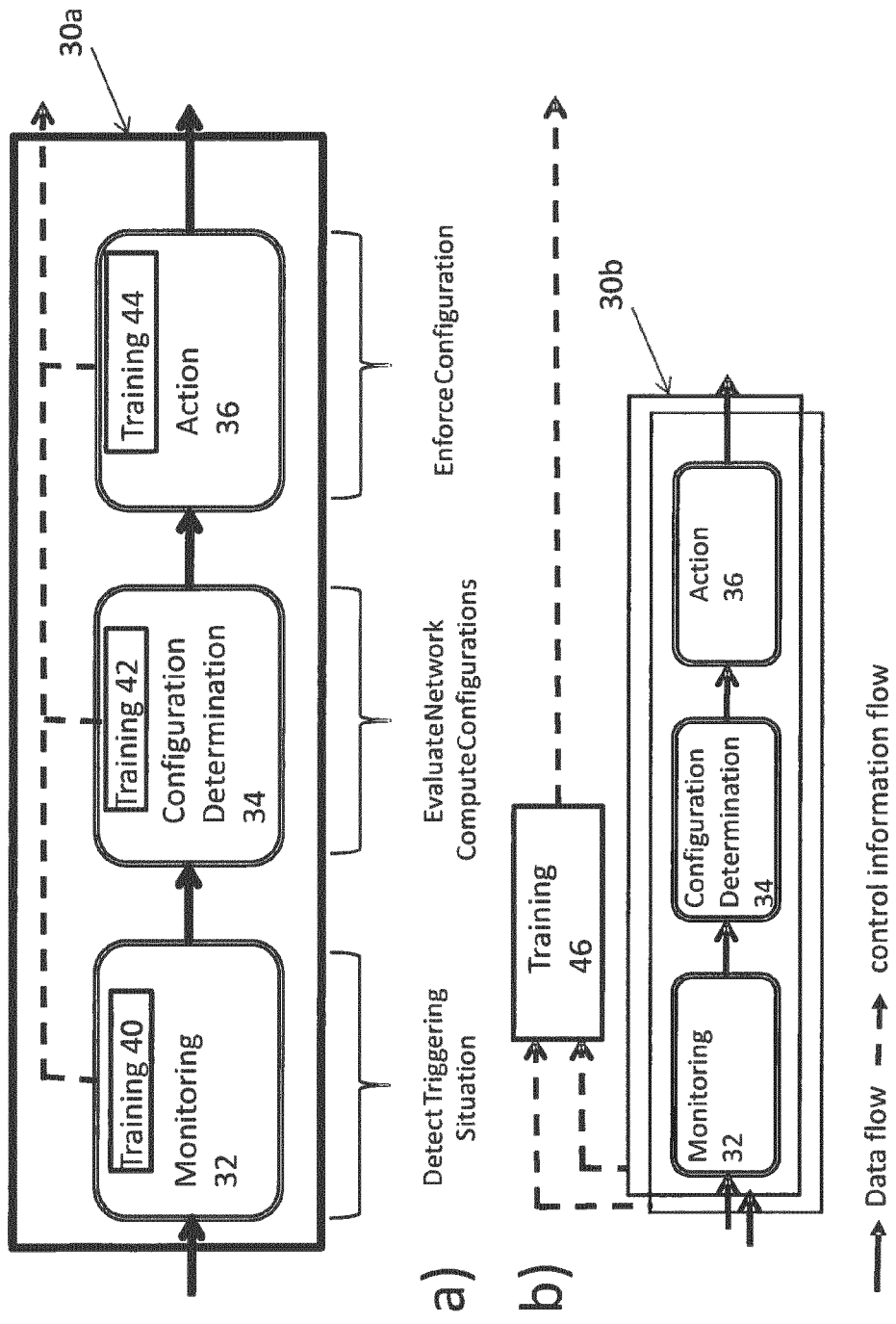
Figure 7:
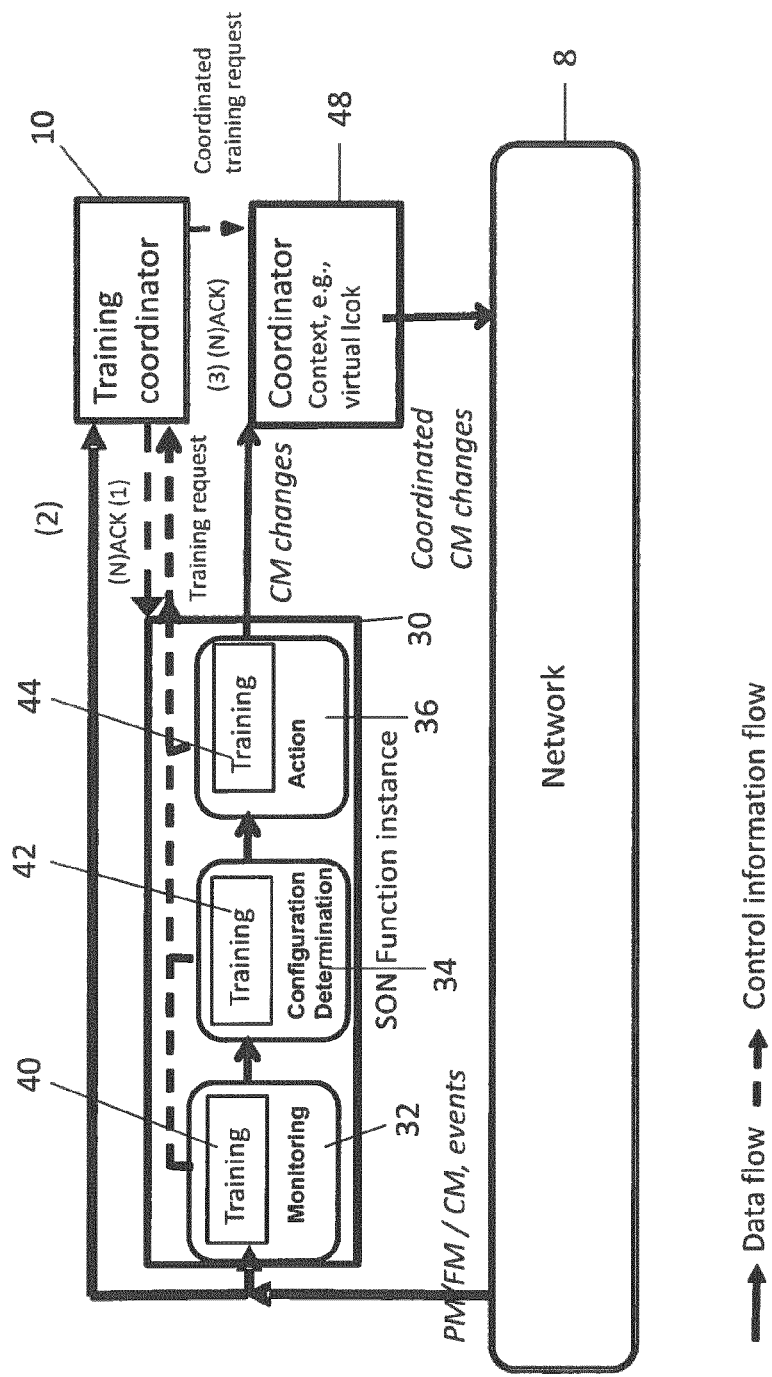

FIG. 4 schematically shows design time preparation and interfaces in an embodiment;

FIG. 5 shows a method of an embodiment;

FIGS. 6a and 6b show two SON function training functions;

FIG. 7 shows one embodiment of a run-time functional architecture; and

Figure 8:
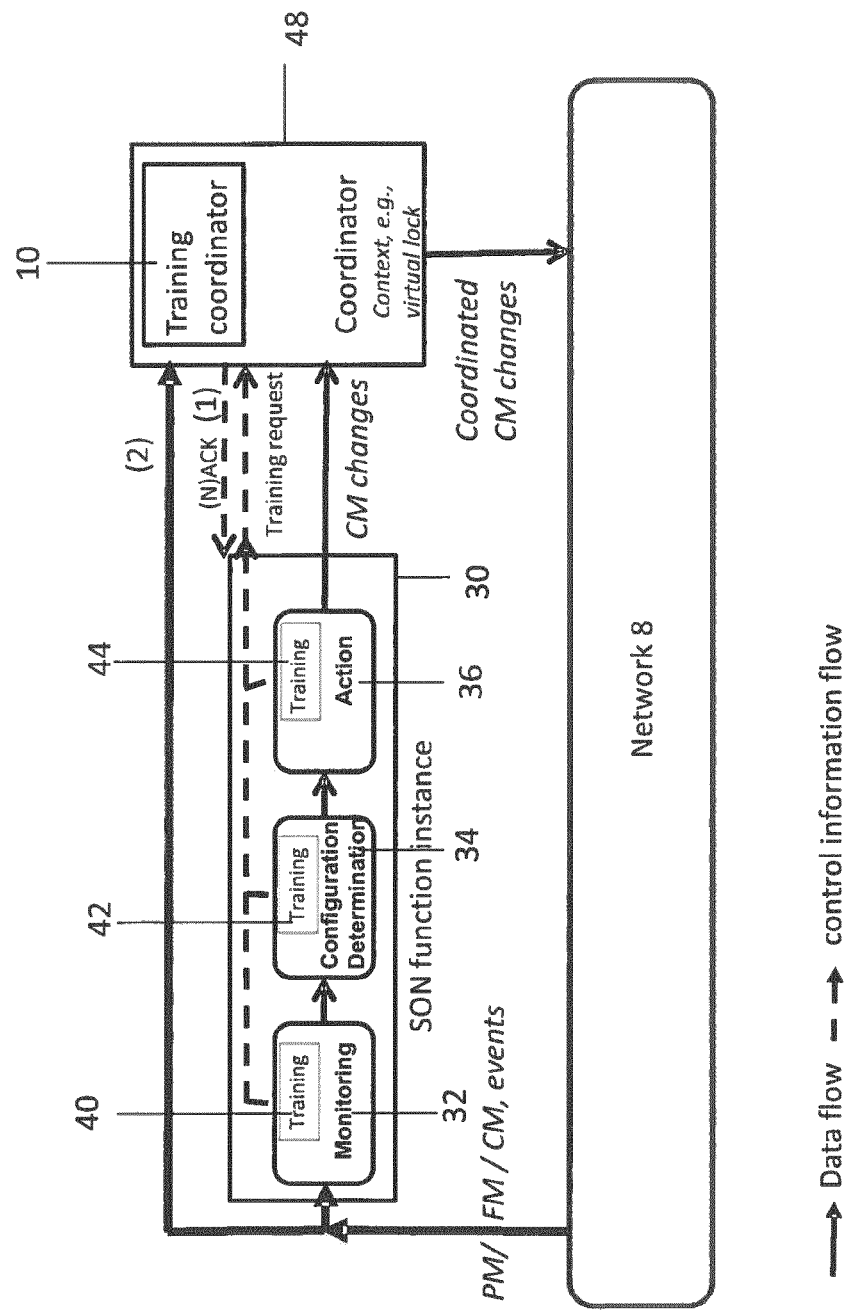

FIG. 8 shows another embodiment of a run-time functional architecture;

In the following certain exemplifying embodiments are explained with reference to a wireless or mobile communication system serving mobile communication devices.

Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipment (UE) 102, 103, 105 are provided wireless access via at least one base station or similar wireless transmitting and/or receiving node or point. In the FIG. 1 example two overlapping access systems or radio service areas of a cellular system 100 and 110 and three smaller radio service areas 115, 117 and 119 provided by base stations 106, 107, 116, 118 and 120 are shown. Each mobile communication device and station may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

Figure 1:
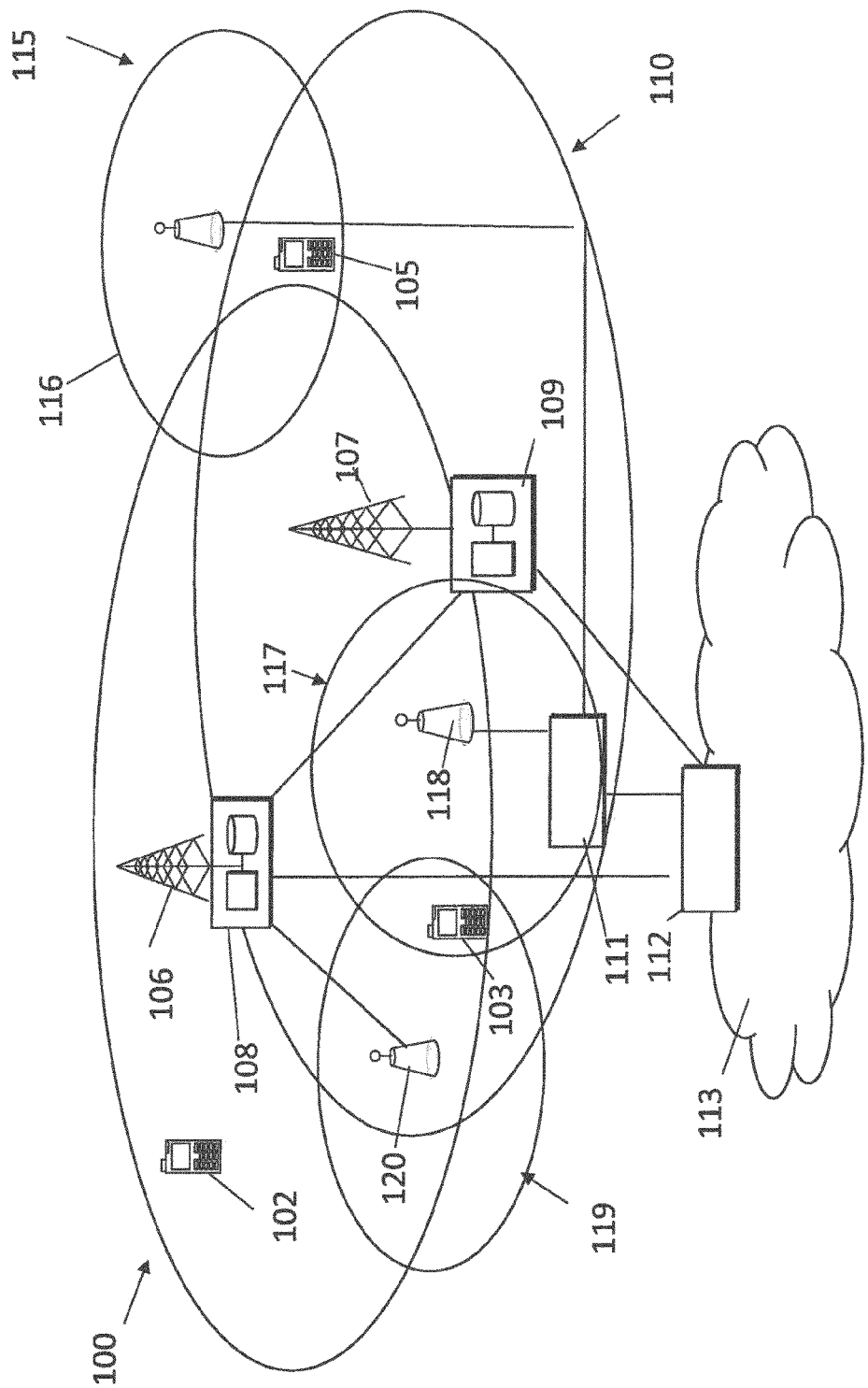
FIG. 1 shows a schematic diagram of a network according to some embodiments.

In FIG. 1 stations 106 and 107 are shown as connected to a wider communications network 113 via gateway 112. A further gateway function may be provided to connect to another network.

The smaller stations 116, 118 and 120 can also be connected to the network 113, for example by a separate gateway function and/or via the controllers of the macro level stations. In the example, stations 116 and 118 are connected via a gateway 111 whilst station 120 connects via the controller apparatus 108. In some embodiments, the smaller stations may not be provided.

An appropriate mobile communication device may be provided by any device capable of sending and receiving radio signals. Non-limiting examples include a mobile station (MS) such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The communication devices 102, 103, 105 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP LTE specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices.

Other examples of radio access system include those provided by base stations of systems that are based on technologies such as wireless local area network (WLAN) and/or WIMAX (Worldwide Interoperability for Microwave Access).

Self-Organizing Networks (SON) allow for automated network management of some communication systems such as LTE or LTE-A, as well as for multi-radio technology networks known as heterogeneous networks (HetNet). SON may provide one or more of self-configuration, self-optimization and healing. Self-configuration deals with the auto-connectivity and initial configuration of new network elements such radio base stations. Self-optimization targets the optimal operation of the network. Self-optimization triggers one or more automatic actions where there is one or more of a change in demand for services, there is a change in user mobility and usual application usability changes, with the result that one or more network parameters need to be adjusted. Self-optimization may alternatively or additionally be used for one or more of energy saving and mobility robustness optimization. The SON may alternatively or additionally provide self-healing which may provide one or more of automatic anomaly detection and fault diagnosis. Areas related to SON may comprise one or more of Traffic Steering (TS) and Energy Savings Management (ESM).

SON aims at replacing conventional offline manual network operation and optimization processes (and associated tools). SON functions may provide individual use cases in one or more the areas mentioned above in an "online" distributed fashion. Instances of a certain SON function type may operate within a specific narrow scope on a relatively small part of data available at a network element or OAM (operation, administration and maintenance) system. SON functions may be supplied by one or more different vendors. One or more SON functions may be integrated within and for a specific network deployment.

A SON function may have a monitoring part that models one or more certain conditions. These one or more conditions may be filtered and/or detected from the input data. The input data may be for example performance data such as one or more of measurements, counters, and Key Performance Indicators. If the monitoring part detects one or more conditions in the input data, a configuration determination part triggered which attempts to determine a better configuration of the resources under consideration. The proposed configuration may be provided to one or more configuration deployment entities. The SON function may thus react to one or more detected conditions.

A SON function may have a generic function area associated therewith. The function area may comprise all network resources which may be manipulated by a SON function to achieve a desired goal.

By way of example function area may comprise at least one of a geographical area and a topological area. For a geographical area, the network resources may be for example a set of cells. For a topological area, the network resources may be for example a set of router interfaces.

SON function instances are the run-time instantiation of for example a specific part of a SON function. The SON function instances may act on network resources in a certain area at a certain time. This means that while the function area is generic, i.e., implies that a given type of function works, e.g., on two adjacent cells, the function instance area is a concrete instantiation of e.g. two specific cells with IDs X and Y being adjacent to each other.

SON function instances may have at least one of a spatial scope (e.g., set of cells, set of network interfaces) and a temporal scope (activity at certain times or time intervals). SON function instances may spontaneously become active (e.g., if the monitoring part detects a given condition in the input data) without any involvement by a human operator or a conventional OAM function. The SON function instances may run inside the OAM system and/or in a network element. The execution of SON functions may be individual and dynamic (i.e. not planned).

SON function instances may not have information going beyond the specific function type and specific instantiation. However, SON function instances may have run-time interactions with each other. A negative interaction is called a conflict. For example, one SON function instance may reduce an error in one part of the system but the correction provided may lead to a problem in a different part of the system.

Different SON function instances operating individually in a single system may be coordinated. One option to perform such coordination is pre-action coordination of SON function instances. This aims to avoiding actions with a negative impact on the overall system. FIG. 3 shows an example of which aims at a virtual locking of network resources to avoid conflicts. A respective coordination result can be enforced using dynamic, virtual locks. The virtual lock or locking is implemented by not locking at the physical resource level, but at the levels above where all the required information for many physical resources are stored and can thus avoid problems such as deadlocks when locking at the physical resource level. This concept is shown in FIG. 3 wherein a coordination layer 251 receives SON function request events 803 and legacy request events 805. The run-time coordination layer in the system may be where all events relevant to coordination are processed and where a dynamic locking scheme may be be enforced. The coordination layer applies the coordination logic resulting in a coordination result. The coordination result can then be sent to be further processed or processed within the coordination layer.

The coordination layer 251 can implement a virtual locking operation in that all change requests, such as the SON function request events and legacy request events 805 pass through the coordination layer which implements the virtual locking 801 action by controlling the network layer 277. The network layer has the cells and network elements associated with the cells.

To be able to execute such a coordination layer, some preparation at design-time may be required. For each existing SON function the one or more of the following set of information may need to be prepared and configured:

Generic coordination logic: this expresses the conflict avoidance strategy which is desired by the network operator, e.g., giving a certain type of function always priority over an active function of another type, based on a priori engineering knowledge;

Generic impact area: the impact area comprises the function area and in addition the network resources which the function impacts. That means the function changes configurations only within its function area, but these changes may impact other resources of the impact area (typically these may be resources geographically or topologically adjacent or at least partially overlapping the function area). For example a function enhances the transmit power of one cell (function area) which as a result increases the interference in many nearby cells (impact area);

Generic impact time: this is the temporal scope of a SON function. The impact-time is defined for pairs of the function types, i.e., the function type and each potentially conflicting function type.

Thus, the role of the SON coordinator at design-time can be summarized as (multi-vendor) SON function system integration.

The partitioning of the SON paradigm into individual, independent functions with a narrow scope may be an advantage, as specific problems in network operation and/or optimization are tackled by a single function serving as a building block. This function can then be combined with other functions from another source by means of SON coordination, thereby avoiding the creation of, e.g., one single monolithic self-optimization function which is difficult to maintain over time, and which can only be customized with difficultly. However, the partitioning may limit the capabilities of the SON functions. For example certain overarching (for example per function and/or system level) knowledge cannot be acquired.

This may be relevant with the deployment of two or more Radio Access Technologies (RATs) in a specific geographical area, and for example where one or more of those RATs are split into two or more cell layers (macro, micro, pico, femto). These are commonly referred to as Heterogeneous Networks or HetNets. Each of the layers will generate data and through the geographic relationship, the generated data exhibits certain relationships which should be taken into account.

The role of the SON coordinator at system design-time can be considered to be SON function system integration. This may involve more than one vendor solution. However, such system integration may only provide a basic part of the information concerning a specific system instance which is instantiated under such system integration.

The completive part of information may be available only after the specific system instance becomes active, for example at system run-time. For example, this may be in test operation or in normal service operation. The completive part of information may change when one or more conditions affecting the specific system instantiation change. By way of example, the conditions may be one or more of a significant user traffic change, a change in network resources, a hardware upgrade, a change in operational policy, or the like. As the result, if there is no valid information for the basic and completive parts, SON function instances as well as the respective part of the SON coordination of the specific run-time system instantiation may not be able to work properly. Therefore, SON function instances and the SON coordination may be trained to capture the completive part of information initially. This may be considered to be model building. The SON function instances and the SON coordination may need to be re-trained. For example the model may be replaced, modified or extended when there is a change of the specific system instantiation. This training may be considered as run-time system integration.

FIG. 6a schematically shows the partitioning of a SON function 30a into a monitoring part 32, a configuration determination part 34, and an action part 44. Associated with each of these parts is a respective training part 40, 42 and 44. FIG. 6a shows the case where training is integrated into the SON function itself, being associated with at least one or each part. The monitoring part will detect a triggering situation, the configuration determination part will evaluate the network and compute configuration information and the action part will enforce the configuration.

In FIG. 6b a setup is depicted where the training part 46 is separated from the SON function and is configured to link to different function instances of a specific type. In the arrangement of FIG. 6b, the SON functionality is as discussed in relation to FIG. 6a.

Some examples of training cases will now be described.

The training may lead to the update of one or more rules, given that SON function instances may implement knowledge as one or more specific fixed rules.

The training may lead to the value change of one or more attributes of the one or more specific rules, but not the rules themselves. For example consider cell anomaly detection. During the training phase, there is a model or profile creation during a healthy state describing what is to be considered normal; operational phase. The training may detect the deviation from the normal state contained in the model. One or more attributes and/or one or more rules may be changed. In this case, training is required for the configuration part of FIG. 6.

Another example is antenna tilt optimization. In the training phase the impact of tilt settings in an area where the network is active but not in commercial use may be determined. In the operational phase the range of tilt values may be limited to the ones contained in the model which has been built in the training phase. In this case, training is required for the configuration determination part of FIG. 6.

One problem to be addressed by some embodiments is how a SON function instance can ensure that the training or model-building phase described satisfies certain requirements and for example reflects a normal or healthy state, where normal or healthy corresponds to a state of the network when the network and its components are fully operational as specified by the network/components vendor and perform within a range as expected by an experienced operator for a certain load condition. In other words, in the usual operating conditions the system will operate such that alarm conditions are avoided.

In some embodiments, a method and apparatus may be provided to ensure the proper training of a SON function instance and, if available, the SON coordinator. Some embodiments may use the design-time or a priori information elements and procedures as well as the corresponding run-time information elements and procedures.

Reference is made to FIG. 7 which shows one example of a run-time functional architecture of an embodiment. As shown in FIG. 7, a network layer 8 is provided. The network layer 8 comprises the cells and network elements, for example as shown in FIG. 1. In the embodiment shown in FIG. 7, a training coordinator 10 is provided. The training coordinator 10 may receive one or more of the events from the network layer. A coordinator 48 is also provided.

The arrangement of FIG. 7 will now be described in more detail and with reference to FIG. 5 which shows a method flow of an embodiment.

In step S1, when a SON function instance becomes active and wants to starts training, the SON function provides its training requirements to the training coordinator via the interface therebetween. This may be provided in the form of a training request. In some embodiments, the training coordinator will acknowledge this request. The training request may contain information on the function type and/or additional information. The additional information may comprise generic and/or specific training area and/or time. In other embodiments, additional or alternative information may be provided.

In step S2, system information and/or events related to the training (e.g., network element alarms) is made available to the training coordinator 10. This may be a network element alarm or any other suitable event. This may be provided from the network layer and/or via one or more SON function instances.

In step S3 the training coordinator will determine if the training request is to be granted. If a training request is granted by the training coordinator, specific measures related to the training request are triggered. The processed training request information may be added to the training coordination context. The training coordination context may be the state which is to be observed when processing a future training request. The context may comprise one or more of information about one or more other function instances still in training and network data (CM/FM/PM/events) as shown in FIG. 4. The coordinated training request is then passed via an interface to the SON coordinator 49. The training coordinator may derive the resulting actual training area and time. This may be comparable to the impact area and impact time previously discussed. The training coordinator decides on the training request based on its training coordination logic and the available training context. The training coordination logic contains the logic relating SON function instances with training requirements which have been integrated up to this point in time. The training coordination logic can for example be accomplished by assigning priorities to SON function types and implementing the resulting logic as decision trees. This may be accomplished by accessing the information stored at design-time in the database.

In step S4, the SON coordinator then treats this request similarly to a configuration change request, i.e., the training request is coordinated against such request(s) which occur for the considered area. Based on the coordination logic (which contains policies related to training requests) a decision is taken and the training request is acknowledged or rejected.

In step S5, in case of a granted training request, the coordinator enforces the decision similarly to a regular configuration change request. This may provide locking of a certain network area with respect to a future configuration change or training requests, in order to avoid impact to the training procedure. This can be implemented using a concurrency control technique. However, a difference to the regular coordination case may be that no actual configuration change is performed. Any suitable method to enforce the locking may be used such as a virtual locking mechanism or actual locking of one or more relevant managed objects in the Operation Support System OSS or Network management system NMS or the NE. In some embodiments, an acknowledgment, if the training request could be granted, may be returned to the training coordinator and/or to the requesting function.

In step S6, events which are relevant for an ongoing training (e.g., administrative lock of cells, severe alarms on a cell, feedback to be used in the training coming from a human or a machine entity) are conveyed to the training coordinator (and thus to the coordination logic responsible to control the training). These events may be provided from the network layer.

Thus in step S7, appropriate actions can be taken and the training context can be updated accordingly (e.g., start a re-training, delay/cancel SON function instance execution, etc.). In some embodiments, the one or more triggered measures comprise locking a certain network area with respect to such future requests, in order to avoid impacting the training procedure.

At design-time, the system is configured with the characteristics of the SON functions such as their training characteristics/requirements. At run-time, there may be a number of instantiations of each function being active. So an actual conflict may happen at run-time between the instances, whereas at design-time from looking at the mentioned characteristics it is possible to determine that two different function types can have potentially a run-time conflict FIG. 7 has shown the training coordinator as a separate entity. FIG. 8 shows an embodiment where the training coordinator is integrated with a system SON coordinator which controls the function instances, i.e., the execution of the functions and/or the execution of configuration actions on the network. In this case, preferably there will be one integrated coordination logic combining the training logic with the SON coordination logic related to the SON function and actions execution. Thus the training coordinator may be either fully integrated with the coordinator, or be at a lower hierarchy level, ie., the actions generated by the training coordinator would go into the SON coordinator for decision on acceptance/rejection.

Figure 2:
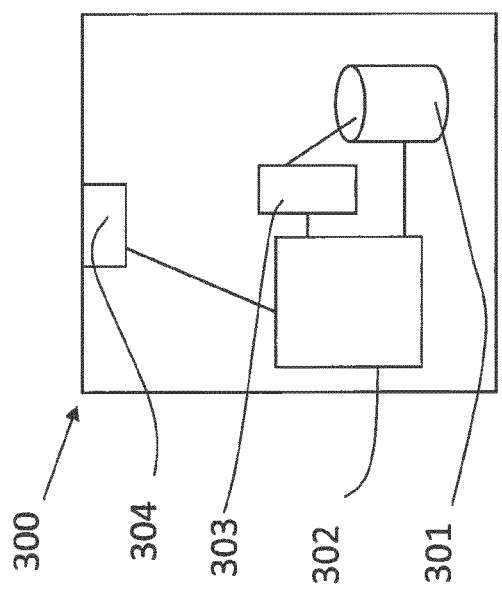
FIG. 2 shows a schematic representation of a SON training coordinator apparatus according to some embodiments.
Figure 3:
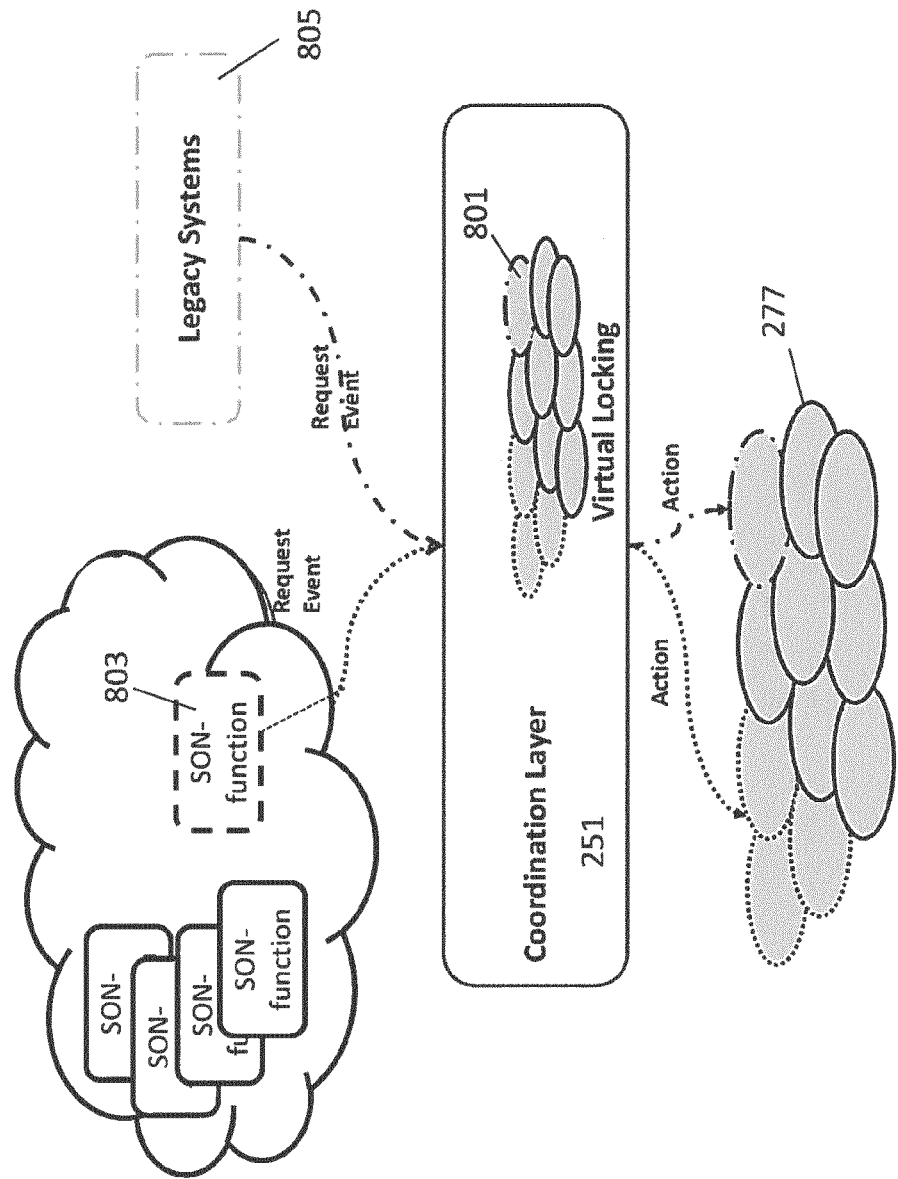
FIG. 3 shows a SON architecture.

The training coordinator, the SON coordinator and/or a combined training coordinator and SON coordinator may be provided by apparatus such as discussed in relation to FIG. 2. FIG. 2 shows an example apparatus. This apparatus may be used to provide one or more of a: training coordinator; SON coordinator; and combined training coordinator and SON coordinator. The controller apparatus 309 is typically provided with at least one memory 301, at least one data processor 302, 303 and at least one input/output interface 304.

It should be appreciated that one or more of the of methods steps may at least be partially implemented by a computer program or algorithm. The computer program will comprise computer executable instructions.

Reference is made to FIG. 4 which shows the preparation for the system operation at design-time. In the example shown in FIG. 4, three SON function instances are shown. These are referenced 2, 4 and 6. It should be appreciated that the number of SON function instances can of course be more or less than three. In the example shown in FIG. 4, the SON function instances are divided into two types. SON function instances 2 and 4 are considered to be type A SON function instances whilst SON function instance 6 is considered to be a second type, type B. The SON function instances are configured to receive one or more events from the network layer. The events may be one or more of fault management events FM, performance management events PM and configuration management events CM.

The training coordinator and the one or more SON function instances may have a control information flow therebetween. The control information flow may be unidirectional (in either direction) or bidirectional. The training coordinator may receive and/or supply control information to the network layer. As described previously, the training coordinator may be a separate entity, and/or be integrated with a (system) SON coordinator which controls the function instances, for example, the execution of algorithms and/or the execution of configuration actions on the network. The training coordinator is configured with one or more interfaces over which actions can be enforced. The one or more interfaces may be with the network layer. There may be an interface to a SON coordinator, one or more interfaces to a SON function instance and/or legacy OAM instances, one or more interfaces to change one or more configurations of one or more network element or the like.

A database 12 is provided which can receive and/or supply data to the training coordinator. The database may receive data from an operator 14. The database 12 may receive data from one or more of the SON function instances.

The preparation for the system operation at design-time is carried out. This may comprise for each function type containing training procedures, configuring one or more of the following information:

Generic training area or scope;

Generic training time information. This may be one or more of start time, end time and time interval. This information may alternatively or additionally be contained in the request to start training;

Training coordination logic. This may comprise the reaction to events which are relevant for the training for function types. Events may be one or more of alarms, training start requests and end notifications. The reaction to events information may be implemented as event condition action (ECA) rules. However, in other embodiments, this may be implemented in a different manner. In some embodiments an alarms may comprise performance management alarms. A performance management alarm may be triggered by a key performance indicator (KPI) crossing a threshold. In some embodiments, this may be part of the general logic for SON coordinator.

The system operator configuration information can be at least one of manually configured or automated.

In the case of manually configuration, the configuration will be performed by a human operator.

In the case of automation, at least one function instance will provide the above information as meta-data at the time when it is integrated into the system.

It should be appreciated that this information can come from the network operator, the network equipment vendor, and/or a specific system integrator.

It should be appreciated that in some embodiments, the information may be partially manually configured and partially automatically configured.

Some examples for functions requiring training will now be described.

Cell anomaly detection—this is a part of the SON self-healing function. In a training phase, a set of profiles describing normal behavior are generated. Some embodiments ensure that the requirements of the cell anomaly detection with respect to a normal (healthy) state for training are met, which is crucial regarding the achievable detection performance Antenna tilt optimization—in a training phase, knowledge on different deployment scenarios (such as rural, urban, etc.), and specific characteristics (e.g., cell size) within those scenarios, can be acquired.

In some embodiments, the training requests can be of the form [REQUEST, TIME_INTERVAL]. This is a request of training and specifies a duration for the training. Alternatively the training request may be split into two requests [REQUEST_ON, REQUEST_OFF]. In other word a request for training is received and training continues until a request to switch off training is received.

Protecting the training phase of intelligent SON function instances may ensure that information, which can only be acquired during actual network operation, is available for the function instances. This is the case because SON function instances need to adapt in operation to for example the specific deployment (e.g., radio propagation) conditions and/or other SON function instances of the same or other type.

A certain, specific set of data (for example training data which may be in the form of meta data) needs to be pre-configured at design-time. That data may be generated by a human operator, an automated tool, or a combination of both. As the preparation is done separately from the run-time system, the data needs to be configured/deployed into the run-time system.

It is also noted herein that while the above describes exemplifying embodiments, there are several variations and modifications which may be made to the disclosed solution without departing from the scope of the present invention.

In general, the various embodiments may be implemented in hardware or special purpose circuits, software, logic or any combination thereof. Some aspects of the embodiments may be implemented in hardware, while other aspects may be implemented in firmware or software which may be executed by a controller, microprocessor or other computing device, although the invention is not limited thereto. While various aspects may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiments. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more of any of the other embodiments previously discussed.

The invention claimed is:

1. A method comprising:
receiving at a training coordinator training information from a self-organising network function and network related information; and
providing to a self-organising network function coordinator a first training request comprising a training request for said self-organising network function and one or more of network related information and training information about one or more other self-organising network functions,
wherein said first training request is configured to cause the self-organising network function coordinator to lock a part of said network to avoid a conflict between said first training request and another training request or a configuration change.

2. The method as claimed in claim 1, comprising determining at least one of a training area and time.

3. The method as claimed in claim 1, wherein said training information comprises a received training request.

4. The method as claimed in claim 3, comprising determining if said received training request is to be granted.

5. The method as claimed in claim 4, wherein said determining comprises using at least one of: training coordination information associated with at least one other self-organising network function; and network related information.

6. The method as claimed in claim 4, wherein if said determining determines that said received training request is to be granted, processing said received training request to provide said first training request.

7. The method as claimed in claim 6, wherein said processing comprises adding one or more of a training area and a time to said first training request.

8. The method as claimed in claim 6, wherein said processing comprises adding one or more of network related information and training information about one or more other self-organising network functions to said first training request.

9. The method as claimed in claim 1, wherein said training information comprises one or more of function type of said self-organising network function; training area; and time.

10. The method as claimed in claim 1, wherein said network related information is received from a network.

11. The method as claimed in claim 1, wherein said network related information comprises one or more of: a network element alarm; a fault management event; a performance management event; and a configuration management event.

12. A computer program embodied on a non-transitory computer-readable medium, said program comprising program code means which, when run on a computer, control the computer to perform the method of claim 1.

13. A method comprising:
    receiving at a self-organising network function coordinator a first training request comprising a training request for a self-organising network function and one or more of:
    network related information and training information about one or more other self-organising network functions,
    wherein said first training request is configured to cause the self-organising network function coordinator to lock a part of said network to avoid a conflict between said first training request and another training request or a configuration change.

14. A training coordinator apparatus comprising at least one processor and at least one memory including computer code for one or more programs, the at least one memory and the computer code configured, with the at least one processor, to cause the apparatus at least to:
    receive training information from a self-organising network function and network related information; and
    provide to a self-organising network function coordinator a first training request comprising a training request for said self-organising network function and one or more of network related information and training information about one or more other self-organising network functions,
    wherein said first training request is configured to cause the self-organising network function coordinator to lock a part of said network to avoid a conflict between said first training request and another training request or a configuration change.

15. The apparatus as claimed in claim 14, wherein the at least one memory and the computer code are configured, with the at least one processor, to cause the apparatus to determine at least one of a training area and time.

16. The apparatus as claimed in claim 14, wherein said training information comprises a received training request.

17. The apparatus as claimed in claim 16, wherein the at least one memory and the computer code are configured, with the at least one processor, to determine if said received training request is to be granted.

18. The apparatus as claimed in claim 17, wherein the at least one memory and the computer code are configured, with the at least one processor, to cause the apparatus to use at least one of: training coordination information associated with at least one other self-organising network function; and network related information to determine if said received training request is to be granted.

19. A self-organising network function coordinator apparatus comprising at least one processor and at least one memory including computer code for one or more programs, the at least one memory and the computer code configured, with the at least one processor, to cause the apparatus at least to:
    receive a first training request comprising a training request for a self-organising network function and one or more of: network related information and training information about one or more other self-organising network functions,
    wherein said first training request is configured to cause the self-organising network function coordinator to lock a part of said network to avoid a conflict between said first training request and another training request or a configuration change.

* * * * *